Nov. 17, 1931.  W. A. JEX  1,831,865
DIFFERENTIAL MECHANISM FOR AUTOMOBILES
Filed July 8, 1929
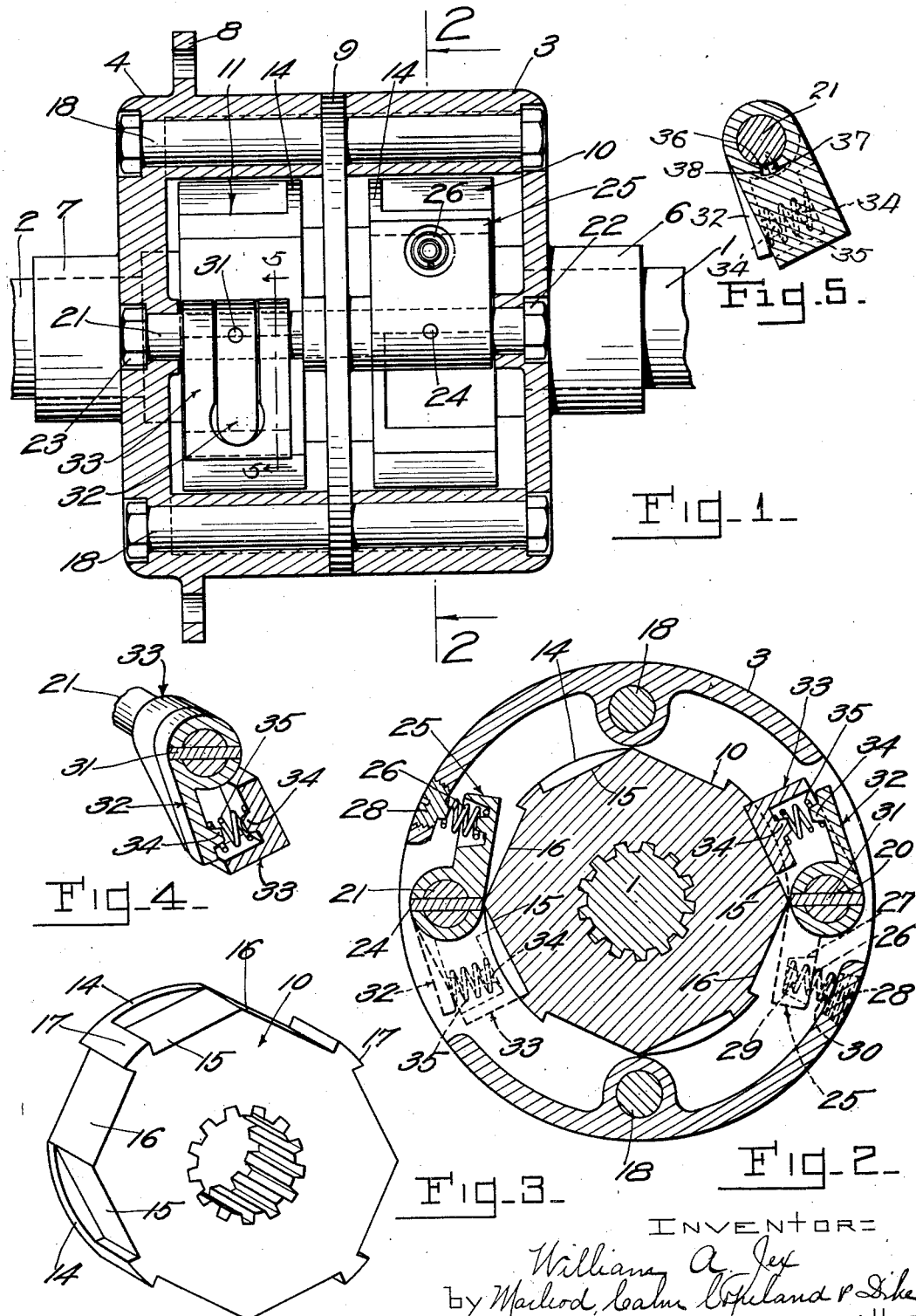
INVENTOR:
William A. Jex
by Macleod, Calver, Copeland & Dike
Attys.

Patented Nov. 17, 1931

1,831,865

UNITED STATES PATENT OFFICE

WILLIAM A. JEX, OF SOMERVILLE, MASSACHUSETTS

DIFFERENTIAL MECHANISM FOR AUTOMOBILES

Application filed July 8, 1929. Serial No. 376,724.

In my prior Patent No. 1,366,805 I have shown a new and improved differential mechanism particularly intended for use in automobiles. The present invention is an improvement on the mechanism shown in said patent and the particular object of the invention is to provide a device which will be more satisfactory and reliable in actual use than the mechanism shown in said patent.

As will be well understood, the strains on the differential mechanism of automobiles and especially of truck are very great, and certain parts of them are sometimes subjected to violent shocks. In the type of differential shown in my prior patent the pawls and shafts which carry them are subjected to especially heavy and violent strains, and unless they are constructed to withstand shocks in the most efficient manner they are liable to failure.

Furthermore, in differentials of this type, it is found that in actual use, as for instance in the case of a heavy truck on a hill, the backing pawl may fly out of its notch if the strain is slightly relieved. This may happen if the notch surface of the ratchet on the edge of the pawl becomes slightly worn or if they do not bear exactly the right relation to each other. Accordingly, another object of my invention is to provide a pawl mechanism which is positive in action and which cannot release its ratchet except upon suitable movement of the other ratchet. This result is accomplished by providing a cam surface on each ratchet by which the pawl on the other ratchet will be positively operated at the proper time. The mechanism is very simple but very strong and reliable and since its action is positive there is no danger that the pawl will release its ratchet when it should not.

In said drawings:

Fig. 1 is a longitudinal section of a differential mechanism embodying my present invention, the interior parts being shown in elevation.

Fig. 2 is a section on the line 2—2, Fig. 1.

Fig. 3 is a view in perspective of one of the ratchets.

Fig. 4 is a perspective view partly in section of one of the two-part pawls.

Fig. 5 is a sectional view taken on the line 5—5 of Fig. 1.

Referring now to the drawings, at 1 and 2 are shown the driven shafts which, in an automobile, are connected with the wheels (not shown). At 3 and 4 are shown two halves of a casing which are each provided with bearing hubs 6 and 7 for the driven shafts. One of the halves 4 of the casing carries a flange 8 to which is secured the ordinary ring gear, not shown, commonly employed in differentials. Between the two halves of the casing is a circular plate 9 which forms a center bearing for the pawl shafts which will be described hereafter.

Within the casing and secured to the driven shafts 1 and 2 by interfitting splines are two ratchets 10 and 11 (see particularly Fig. 3) which also include cam surfaces 14 by which the pawls are operated. The ratchets are constructed with a narrow notch surface 15 adjacent each cam surface 14 and a full width notch surface 16 just behind the rib 17 which separates these two surfaces. Both ratchets have similar construction and are the same except that the cam surface 14 of both ratchets is on the side of the ratchet adjacent the center plate 9.

The two halves 3 and 4 of the casing and the center plate 9 are held together by bolts 18. There are also provided two pawl shafts 20 and 21 which are free to rock in bearings in the two halves 3 and 4 of the casing and the center plate 9. On the ends of the pawl shafts 20 and 21 are placed nuts 22 and 23. It will be seen that these pawl shafts are supported at both ends and at the middle by the parts of the casing. Each pawl shaft is provided with two pawls which are conveniently called the forward and backing pawls. The forward pawl 25 is wide enough to ride on the cam surface 14 and at other times to fill the full width of the notches 16. Between the pawl 25 and the interior of the casing is placed a coiled spring 26 which pushes the pawl 25 toward its ratchet, and into the notches except when it rides on the cam surface 14. To prevent displacement, the inner end of the spring is seated around a small central projection 29 in a pocket 27 in the pawl, while the outer end is seated around a similar projection 30 formed on a removable plug 28 in threaded engagement with the casing.

The backing pawl which is on the other end of the pawl shaft 20 or 21 is formed in two parts. Of these parts, a pawl finger 32 is secured by a pin 31 to the pawl shaft and outside of the finger 32 and loose on the pawl shaft is a forked or U-shaped pawl 33 having a groove 36 engaged by a pin 37 on the pawl shaft. In this manner lost motion is provided between the pawl shaft and the backing pawl in the same manner as provided in my prior above mentioned patent. This pawl 33 is wide enough to receive between its legs the pawl finger 32 and both members are provided with circular projections 34 to receive and center an enclosed spring 35. These parts are constructed so that the spring mechanism is entirely within the pawl and the forked pawl 33 and pawl finger 32 occupy substantially all of the space between the end member of the casing and the center plate except for the width of the cam surface 14 of the ratchets 10 or 11 as the case may be.

The forward pawl 25 on the other end of the pawl shaft 20 also occupies practically the entire space between the center plate 9 and the inside of the casing 4. By this construction the pawls may be made exceedingly strong, and the pawl shaft is not subjected to any substantial bending stresses, the stresses on the contrary being shearing stresses.

The construction described also provides means for giving the pawls the necessary spring action without making the pawls narrow and thus subjecting the pawl shafts to bending stresses.

In the operation of the device embodying my invention, the pawl 25 is held towards its ratchet by the spring 26 and at the same time the forked or backing pawl 33 on the same shaft is held towards it ratchet by the spring 35 which is interposed between the forked pawl and the pawl finger 32. The teeth on the ratchet are free to pass under the forked pawl as long as the other pawl is in the notch 16. When, however, any relative movement of the ratchets brings the pawl 25 on under the cam surface 14 of its ratchet, the forked pawl 33 is forced downwardly to a point low enough to cause its point to engage the next tooth of its ratchet, this being in the space 15 adjacent one of the cam surfaces 14. This action locks the ratchet and its wheel against rotation and holds them locked as long as the pawl 25 is on one of the cam surfaces 14 of its ratchet. The action of the forked pawl is, therefore, a yielding one but the strength of the device is not sacrificed as is the case where the spring which operates the pawl is located between the pawl and the adjacent portion of the casing thus causing severe bending stresses on the pawl shafts. When any relative movement of the ratchets causes either of the pawls 25 to engage a tooth of its ratchet, the movement of the pawl shaft causes the pin 37 to engage the shoulder 38 at the end of the groove 36 to lift the pawl 33 out of engagement with the teeth of its ratchet.

What I claim is:

1. In a differential mechanism and in combination, a ratchet, a pawl shaft, a pawl thereon, said pawl comprising two members one of which is fixed to the pawl shaft and the other of which has limited pivotal movement on the pawl shaft and a spring between the pawl members.

2. In a differential mechanism and in combination, a ratchet, a pawl shaft, a pawl thereon, said pawl comprising two members one of which is fixed to the shaft and the other of which is U-shaped and surrounds the fixed member and is pivoted on the pawl shaft and a spring between the pawl members.

3. In a differential mechanism and in combination, a ratchet, a pawl shaft, a two-part pawl thereon, one of said parts being movable with relation to the other, and a spring enclosed between said parts.

4. In a differential and in combination, a hollow casing, two ratchets within the casing having teeth and cam surfaces, a pawl shaft, oppositely extending pawls on said pawl shaft, a spring between one of said pawls and the inside of the casing, the other of said pawls being composed of two members one of which is a finger fixed to the pawl shaft and the other of which is pivoted thereon, and a spring interposed between the said finger and the pivoted member and tending to urge the latter toward the ratchet.

5. In a differential mechanism, a rotatable ratchet having teeth, a pair of pawls pivotally mounted to extend in opposite directions with respect to the direction of rotation of said ratchet, one of said pawls being adapted to engage one face of each tooth, a cam surface extending from each of said faces, the other of said pawls being arranged to engage the other face of each tooth and said cam surfaces.

6. In a differential mechanism and in combination, two ratchets having teeth and having cam surfaces on one side adjacent the teeth, oppositely extending pivotally mounted pawls, one of said pawls being wide enough to engage the teeth and adjacent cam surfaces of one ratchet, the other pawl being only wide enough to engage the teeth of the other ratchet, and means including connections between said pawls causing the last mentioned pawl to move into engagement with said teeth when the other pawl engages said cam surfaces.

7. In a differential mechanism and in combination, two ratchets having teeth and having cam surfaces adjacent the teeth, oppositely extending pivotally mounted pawls, one of said pawls being arranged to engage the teeth and adjacent cam surfaces of one ratchet, the other pawl being arranged to engage the teeth of the other ratchet but not engage the said cam surfaces thereof, and means including connections between said pawls causing the last mentioned pawl to move into engagement with said teeth when the other pawl engages said cam surfaces.

8. In a differential mechanism and in combination, a hollow casing, two ratchets within the casing having teeth and cam surfaces, oppositely extending pivotally mounted pawls, one pawl being adapted to engage one ratchet and the other pawl being adapted to engage the other ratchet, and means for holding one pawl in engagement with a tooth of one ratchet and the other pawl out of engagement with the teeth of the other ratchet including a spring between one pawl and the inside of the casing.

9. In a differential mechanism, a pair of ratchets, each having teeth and cam surfaces adjacent the teeth, two pairs of pivotally mounted pawls, one pawl of each pair of pawls being adapted to engage the teeth only of one ratchet and the other pawl being adapted to engage the teeth and the said cam surfaces of the other ratchet, and means including connections between the pawls of each pair causing one pawl of each pair to move into engagement with said teeth when the other pawl engages said cam surfaces.

10. In a differential mechanism, a ratchet having teeth formed upon its periphery, an inclined surface extending from a point on said periphery on each side of each tooth and spaced therefrom and terminating at the base of the tooth, one of said surfaces being interrupted by a radial projection extending circumferentially of the ratchet between said surface and said tooth, the other of said surfaces extending the full width of the ratchet.

11. In a differential mechanism, a ratchet having teeth formed upon its periphery, oppositely inclined surfaces extending from a point on said periphery intermediate adjacent teeth and terminating at the base of said teeth, one of said surfaces having a radial projection extending from said intermediate point to the teeth adjacent thereto.

In testimony whereof I affix my signature.

WILLIAM A. JEX.